United States Patent [19]

Poulton et al.

[11] 3,970,123

[45] July 20, 1976

[54] HANDLING OF MATERIALS

[75] Inventors: Barrie Armstrong Poulton, Cheltenham; Robert Paton Bayne, Cheadle Hulme, both of England

[73] Assignee: Simon-Barron Limited, Stockport, England

[22] Filed: May 13, 1974

[21] Appl. No.: 469,481

[52] U.S. Cl. .............................. 141/351; 214/307; 214/308; 222/509
[51] Int. Cl.² ........................................ B65G 67/40
[58] Field of Search ................... 214/302, 307, 308; 222/501, 509, 196, 198; 141/351, 352, 353, 354, 355, 363, 364, 365, 72

[56] References Cited
UNITED STATES PATENTS

| 2,788,809 | 4/1957 | Paton | 141/353 |
| 3,123,107 | 3/1964 | Kappler | 141/363 |
| 3,339,808 | 9/1967 | Sterns | 222/196 |
| 3,407,972 | 10/1968 | Cymbalisty | 222/196 |
| 3,447,706 | 6/1969 | Moriarty | 214/305 |
| 3,631,904 | 1/1972 | Mason et al. | 141/351 |
| 3,854,612 | 12/1974 | Snape | 222/196 |

FOREIGN PATENTS OR APPLICATIONS

| 998,432 | 9/1945 | France | 222/196 |

*Primary Examiner*—Robert J. Spar
*Assistant Examiner*—Lawrence J. Oresky
*Attorney, Agent, or Firm*—Norris & Bateman

[57] ABSTRACT

A transportable container for particulate solid material and receiving means for the container which is adapted to removably receive the container and which is capable of being actuated to promote flow of material from the container.

21 Claims, 4 Drawing Figures

HANDLING OF MATERIALS

This invention concerns the handling of powdered, granulated or other particulate solid materials. Such materials will hereinafter be termed materials of the kind referred to.

Materials of the kind referred to are widely used by the process industries and are normally dispensed for use from bins or hoppers. The materials may be delivered to the position where they are to be used in many different ways, but will normally be stored in bulk before being passed to such bins or hoppers.

The use of transportable containers which are adapted to be returned to a source of supply for re-filling when emptied has been proposed with a view to reducing the extent to which the materials need to be handled.

Many materials of the kind referred to have physical characteristics making it difficult to cause them to flow in a controlled manner out of a bin or container necessitating the use of sophisticated equipment to overcome the problem and mounted adjacent the outlet from such bins or containers. This particular problem has prevented the use of transportable containers from being as widely accepted as would be desirable.

Amongst the more successful type of device for promoting the flow of material from a bin or hopper is one of the kind comprising a material receiving member adapted to be positioned beneath the outlet opening of the bin or hopper and having a central orifice therein for the discharge of material, there being a baffle mounted over said central opening to prevent direct flow of material from the hopper therethrough, there being means to cause vibration of the material receiving member and the baffle to promote the flow of material. Such a device will hereinafter be described as a bin activator device of the kind referred to.

If a bin activator device of the kind referred to is to operate successfully, it is necessary that the dimension of the annular space between the periphery of the baffle and the walls of the hopper is carefully controlled and dependent upon the physical characteristics of the material being handled.

It is an object of the present invention to provide a transportable container for materials of the kind referred to, which is adapted to be positioned on fixed equipment to provide a combination which can be operated to promote the flow of material from the container, in a manner of comparable efficiency with that which can be obtained when emptying conventional fixed bins or hoppers equipped with bin activator devices of the kind referred to.

According to the invention there is provided the combination of a transportable container for materials of the kind referred to, and equipment adapted to be permanently located at the position where the material is to be dispersed from the container, and which is adapted to removably receive said transportable container, the combination being capable of being actuated to promote flow of the material from the container, said transportable container having a circular opening at its lower end defined at the base of a wall portion of inverted truncated conical form, said opening normally being closed by a valve member which is movable upwardly into the interior of the container to define an annular opening between its periphery and the internal surface of the lower wall portion of the container, the arrangement being such that when said transportable container is positioned on said equipment, means on said equipment engage with the underside of said valve member to raise same such that the valve member and equipment then form a bin activator device of the kind referred to, and means being provided whereby positioning of the container on the equipment automatically raises the valve member to a predetermined extent, which is capable of adjustment.

Also according to the invention are the separate parts of the combination aforesaid.

The invention will be further apparent from the following description with reference to and as illustrated by the several figures of the accompanying drawings, which show by way of example only, one form of apparatus embodying the invention.

Figure 1:
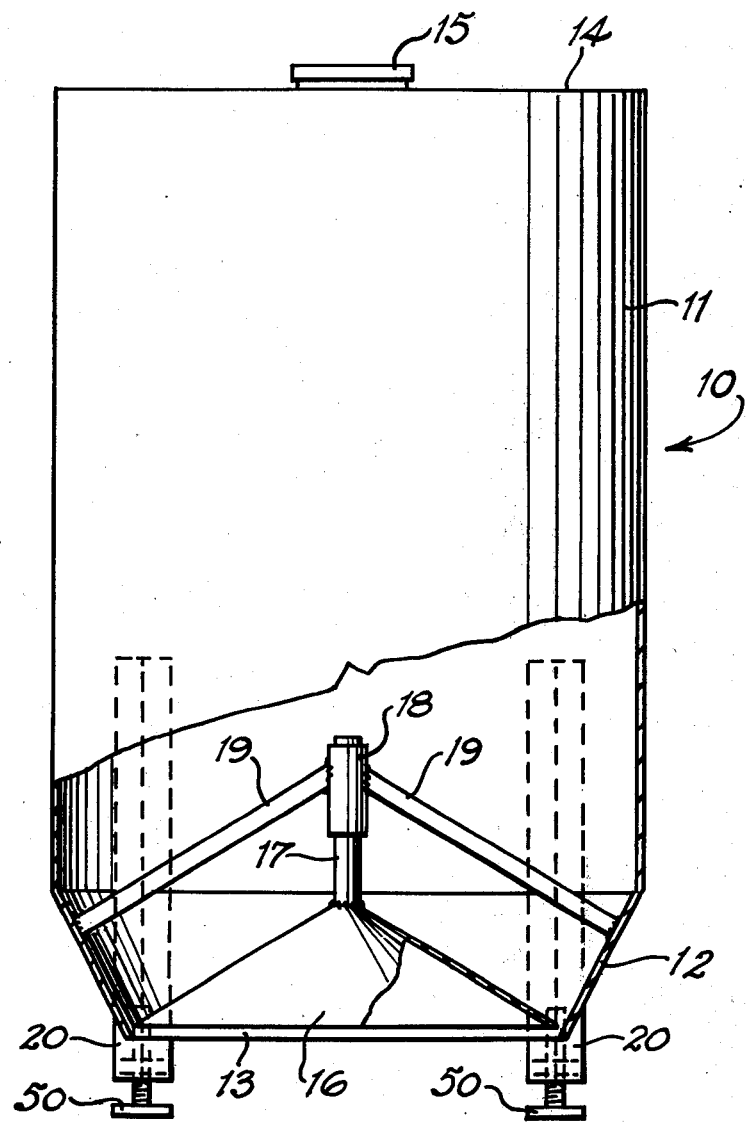
FIG. 1 shows a partially-sectioned side elevation of a transportable container.

Referring firstly to FIG. 1, it will be seen that the transportable container, which is generally indicated by the reference numeral 10, includes an upper portion of circular cross section and defined by a cylindrical shell 11, and a lower portion of hopper form defined by an inverted truncated conical wall 12. The lower portion has a central circular opening 13 at its base. The upper end of the container 10 is closed by a wall 14 provided with openable port 15.

The opening 13 is normally closed by a valve member 16 in the form of an upright conical shell, whose outermost peripheral edge engages with the internal surface of the wall 12. The valve member 16 is mounted at the lower end of a vertical rod 17 extending within the container 10 along the central vertical axis thereof, the lower end of the rod 17 being welded or otherwise secured to the apex of the cone defining the member 16. The rod 17 is slidable in a sleeve 18 supported in position by means of stays 19 extending therefrom to the internal wall surfaces of the container 10. The container 10 is provided with four legs defined by girder sections 20, whose lower ends are positioned slightly below the opening 13 whereby the container may be stood upon the ground.

Figure 2:
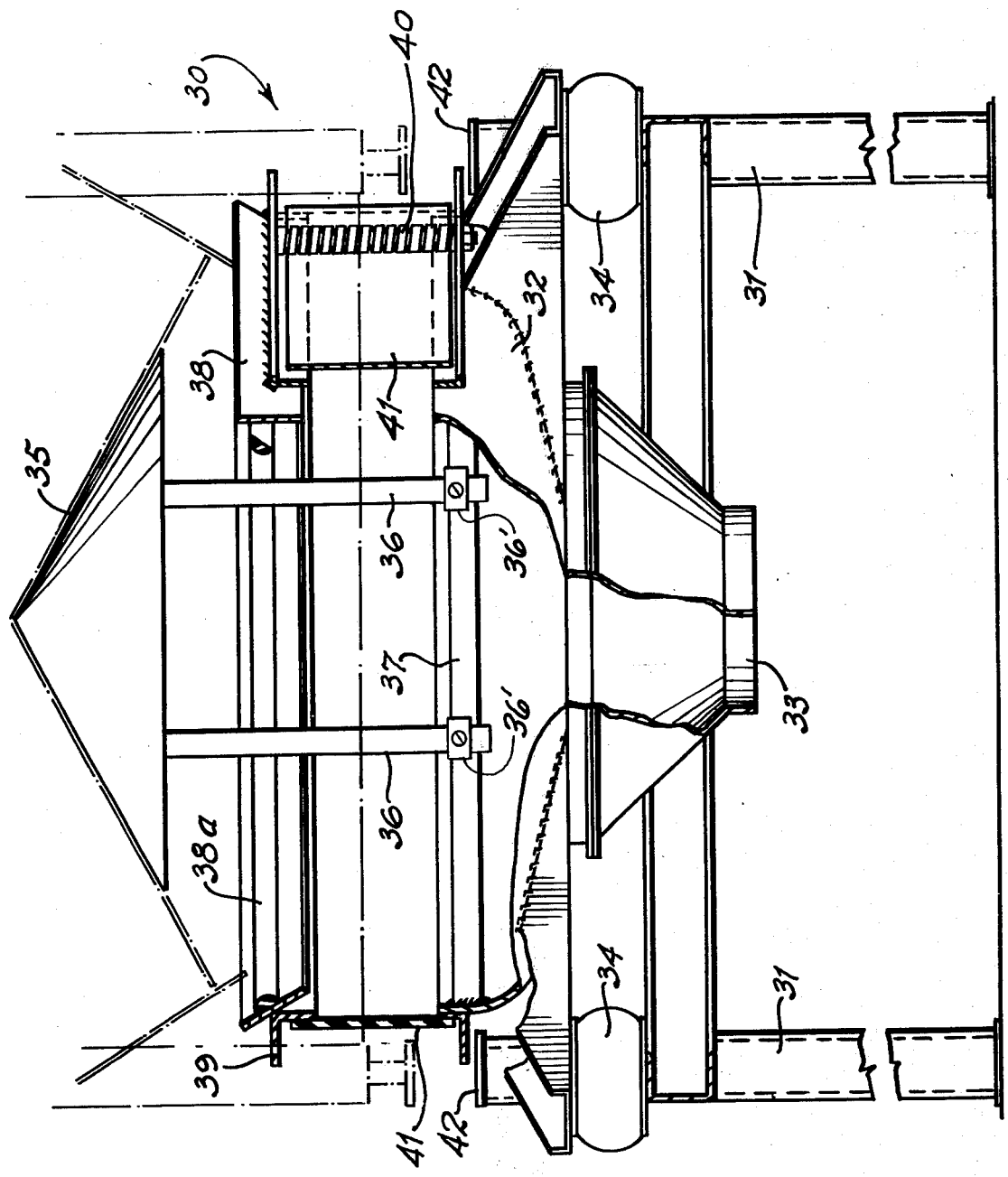
FIG. 2 shows a partially-sectioned side elevation of equipment adapted to receive the transportable container of FIG. 1.

Turning now to FIG. 2, it will be seen that the equipment generally indicated by the reference numeral 30 is mounted on a frame including supporting legs 31 to hold same at an elevated position. The equipment 30 is generally of a known form and includes a material receiving member 32 of dish-like form having a central opening 33 in its lower extremity for the discharge of material. The member 32 is secured to the frame through the intermediary of resilient isolators 34.

Mounted above the central opening 33 is a baffle member 35 in the form of an upright conical shell supported by posts 36 fixed during operation to cross members 37 extending transversely of the member 32. Baffle member 35 may be vertically adjustable by slidably mounting posts 36 in rigid collars on cross members 37 with the adjusted position maintained as by set screws, as illustrated at 36' in FIG. 2.

Upwardly spaced from the dish-like member 32 is a circular inclined flange 38 having a resilient annular sealing strip 38a on its inwardly directed face. The flange 38 is secured as for example by welding to a circular frame member 39. The frame member 39 is urged upwardly by means of compression springs 40 located therebeneath and extending upwardly from the frame at spaced intervals around its periphery. An elastic sleeve 41 serves to form a seal between the upper periphery edge of the dish-like member 32 and the frame member 39.

Vibration motor means 60 of any suitable known kind are provided and secured to the equipment for causing the members 32 and 35 to be vibrated when the motor means is actuated. The mode, direction and amplitude of the vibrations may be of any suitable kind having regard to the nature of the material which is to be handled. In a preferred arrangement, the vibration is reciprocatory or gyratory and in a horizontal plane.

In use the transportable containers 10 can be filled at one location with particulate solid material through the ports 15 therein, and can then be transported by any suitable means to the location where the material is to be used, it being understood that equipment as shown in FIG. 2 is provided at such location. Each container 10 is adapted to be lifted by crane or similar and lowered into engagement with the equipment 30, the lower ends of the legs 20 engaging with pads 42 carried by the frame of the equipment 30 for this purpose.

As the container 10 is lowered onto the equipment 30 the baffle member 35 engages and mates with the underside of the valve member 16 causing the latter to be raised relative to the walls of the container 10 to define an annular opening between its periphery and the internal surfaces of the wall 12.

It will be understood that actuation of the vibration means referred to above, besides causing vibration of the dish-like member 32 causes vibration of the valve member 16 which forms an extension of the baffle member 35 to cause material to flow from the interior of the container 10 through the openings 13 and 33.

Figure 3:
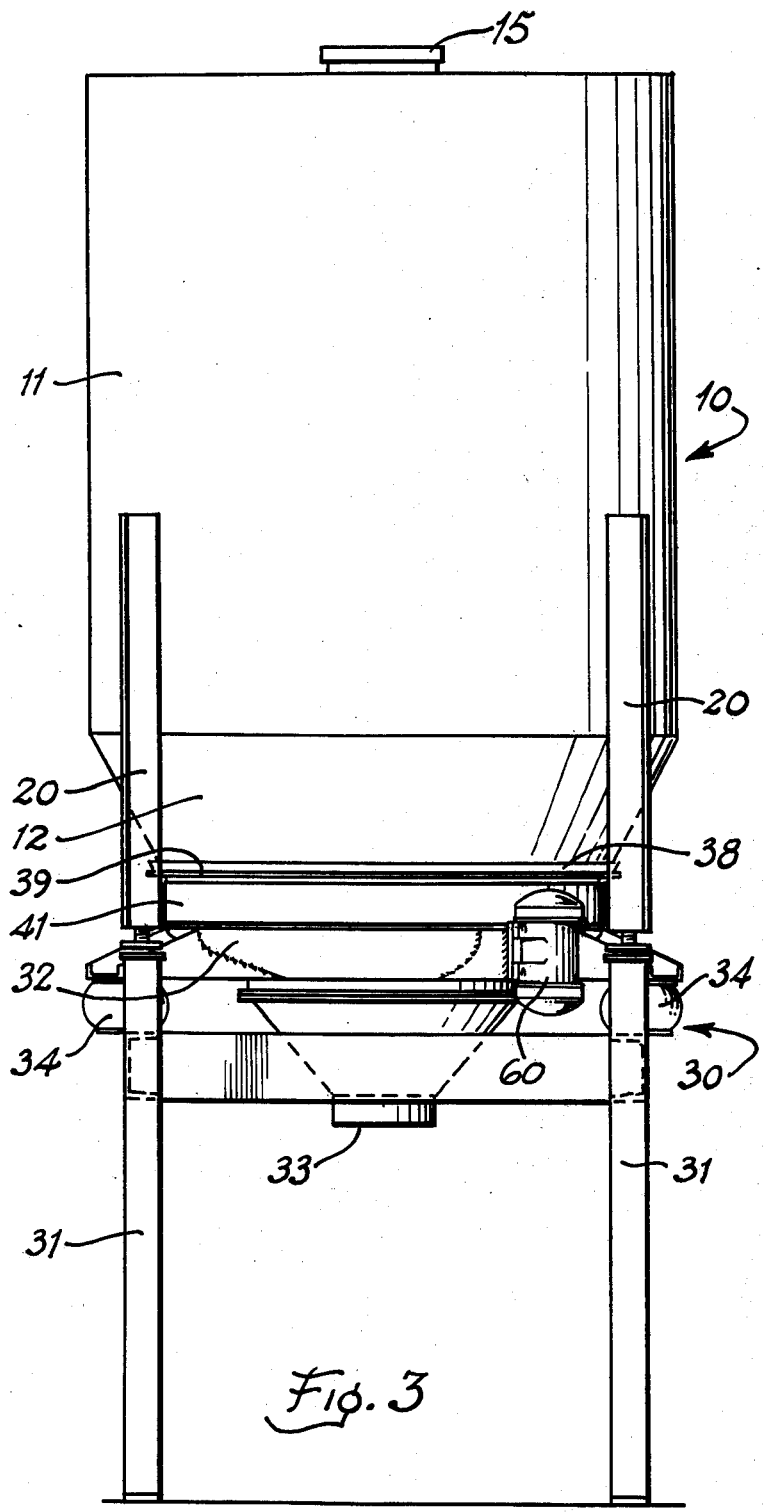
FIG. 3 shows a vertical cross section through the container of FIG. 1 and the equipment of FIG. 2 when connected together.

As best seen from FIGS. 2 and 3, the sealing strip 38a is urged into engagement under the action of the springs 40 with the outside surfaces of the wall 12 to form a complete seal between the interior of the container 10 and the dish-like member 32.

In accordance with the invention means is provided whereby the extent to which the valve member 16 is raised and hence the dimension of the annular opening between the periphery of the member 16 and wall 12, when the container 10 is in position on the equipment 30, can be adjusted, having regard to the nature of the material to be dispensed. This can be achieved by having vertically adjustable feet 50 at the lower ends of the legs 20, or alternatively vertically adjustable receiving pads 42 on the frame of the equipment 30.

This can also be achieved by the vertical adjustment of baffle member 35 relative to cross members 37 as shown in FIG. 2.

Figure 4:
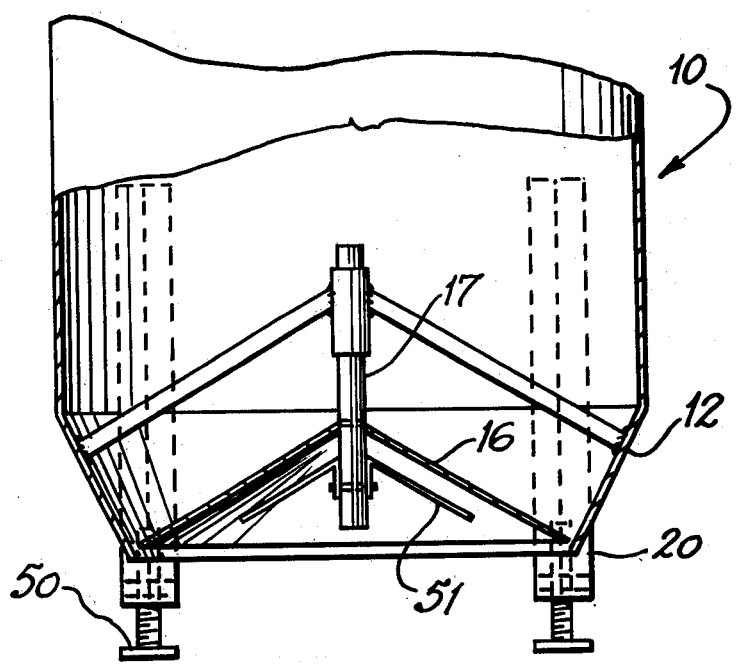
FIG. 4 shows a vertical cross section through a transportable container similar to that of FIG. 1, but having a modified closure valve construction.

An alternative possibility as shown in FIG. 4 is to extend the rod 17 through the valve member 16 and to provide a second conical member 51 adjustably slidable thereon, adapted to mate with the member 35 which would, of course, require a central aperture to receive the lower end of the rod 17.

It will be understood that once a transportable container 10 has been emptied it can be returned to the first location for refilling. In this way material can be supplied continuously between the two locations with a minimum of auxiliary handling, the transportable containers 10 being used as the stores from which the material can be dispensed directly when required for use and in the quantities required at any time.

It will be appreciated that it is not intended to limit the invention to the above example only, many variations, such as might readily occur to one skilled in the art, being possible without departing from the scope thereof.

Thus, for example, the form of the activator device may be different from that described. It is not necessary for the activator device to include a conical baffle member 35, any means for engaging the underside of the valve member 16 of the containers 10 being suitable, provided such is capable of transmitting vibration.

Of course the material receiving member 32 and valve member 16 may be vibrated at different frequencies and/or in different directions as desired.

Again, for example, the means on the equipment for engaging the underside of the valve member of the transportable container may be vertically adjustable as an alternative means of adjusting the extent to which the valve member is opened when the combination is in use.

What is claimed is:

1. Apparatus comprising the combination of a transportable container for particulate materials, and equipment adapted to be permanently located at the position where the material is to be dispensed from the container, and which is adapted to removably receive said transportable container and to actuate said container to promote flow of the material from the container to said equipment, said transportable container having an opening at its lower end defined at the base of a wall portion of downwardly decreasing cross section, a valve member mounted within the container in the direct path of material in the container to normally close said opening and to be movable upwardly within the interior of the container to define an annular dispensing opening between its periphery and the internal surface of said lower wall portion of the container, and said equipment having actuating means for said valve, the arrangement being such that when said transportable container is positioned on said equipment, said valve actuating means on said equipment is operatively connected to said valve member to automatically raise the same a predetermined extent relative to the body of the container and thereby provide said dispensing opening, and means operative when said container is so combined with said equipment for effecting material flow promoting vibration of surfaces of both said container and equipment that are contacted by said material during discharge of said material into the equipment, said equipment comprising a material receiving member of generally dish-like form and having a central circular bottom opening therein, frame means for supporting said material receiving member in an elevated position with respect to the ground, resilient isolator means disposed between the receiving member and the frame means, pad means on the frame means adapted to engage with and support said transportable container in position above the equipment, upstanding means supported by the material receiving member at a central elevated position and adapted to raise said valve member by a predetermined extent when the container is positioned on the equipment, means for forming a seal between the periphery of the material receiving member and the outside wall surface of the lower portion of the container when the container is positioned on the equipment, and said vibrating means comprising means for vibrating the material receiving member and said upstanding means whereby vibrations are also transmitted to the valve member of the transportable container in the combination.

2. In the apparatus defined in claim 1, said transportable container being a container whose lower portion is of hopper form defined by an inverted truncated conical wall defining a central circular opening at its base, said opening normally being closed by said valve member.

3. In the apparatus defined in claim 2 said valve member being in the form of an upright conical shell.

4. In the apparatus defined in claim 3, a rod extending upwardly into the interior of the container from the apex of said upright conical shell, said rod being slidable in a sleeve supported within the container on the central vertical axis thereof by supporting members extending between the sleeve and the walls of the container.

5. In the combination defined in claim 2, depending legs on the container whereby the container may be stood upon the ground in a vertical position with the central opening at the base of the container spaced above the ground surface or positioned on fixed means on said equipment.

6. In the combination defined in claim 5, said legs being provided with vertically adjustable feet, whereby the height through which the valve member is raised by the said valve actuating means when the container is positioned on the equipment may be adjusted.

7. In the combination defined in claim 5, said valve member having a vertically adjustable part on the underside thereof, and the valve actuating means on the equipment being adapted to engage with said adjustable part whereby the height through which the valve member is raised when the container is positioned on the equipment may be adjusted.

8. In the apparatus defined in claim 1 said pad means being adjustable as to height whereby the vertical position of the container when in position on the equipment can be varied relative to the frame means, and thus the height through which the valve member is raised may be adjusted.

9. Apparatus as defined in claim 8, said upstanding means being in the form of an upright conical shell adapted to mate with the under-surface of the valve member of the transportable container.

10. Apparatus as defined in claim 8, said means for forming a seal with the outside wall surface of the lower portion of the container when in position on the equipment comprising a resilient sealing ring carried on the inside surface of an annular support member which is urged upwardly by resilient spring means positioned between same and said frame means, there being a flexible sleeve between said annular support member and the peripheral edge of said material receiving member.

11. Apparatus as defined in claim 1, said upstanding means being vertically adjustable, whereby the height through which the valve member is raised when the container is positioned on the equipment may be adjusted.

12. Apparatus as defined in claim 11, said upstanding means being in the form of an upright concial shell adapted to mate with the under-surface of the valve member of the transportable container.

13. Apparatus as defined in claim 12, said means for forming a seal with the outside wall surface of the lower portion of the container when in position on the equipment comprising a resilient sealing ring carried on the inside surface of an annular support member which is urged upwardly by resilient spring means positioned between same and said frame means, there being a flexible sleeve between said annular support member and the peripheral edge of said material receiving member.

14. Apparatus as defined in claim 11, said means for forming a seal with the outside wall surface of the lower portion of the container when in position on the equipment comprising a resilient sealing ring carried on the inside surface of an annular support member which is urged upwardly by resilient spring means positioned between same and said frame means, there being a flexible sleeve between said annular support member and the peripheral edge of said material receiving member.

15. Apparatus as defined in claim 1, said upstanding means being in the form of an upright conical shell adapted to mate with the under-surface of the valve member of the transportable container.

16. Apparatus as defined in claim 15, said means for forming a seal with the outside wall surface of the lower portion of the container when in position on the equipment comprising a resilient sealing ring carried on the inside surface of an annular support member which is urged upwardly by resilient spring means positioned between same and said frame means, there being a flexible sleeve between said annular support member and the peripheral edge of said material receiving member.

17. Apparatus as defined in claim 1, said means for forming a seal with the outside wall surface of the lower portion of the container when in position on the equipment comprising a resilient sealing ring carried on the inside surface of an annular support member which is urged upwardly by resilient spring means positioned between same and said frame means, there being a flexible sleeve between said annular support member and the peripheral edge of said material receiving member.

18. The apparatus defined in claim 1, wherein adjustment means is provided for varying the extent to which said valve member is raised when the container is combined with said equipment.

19. The apparatus defined in claim 1, wherein said actuating means is a fixed member on said equipment adapted to engage the underside of said valve member.

20. The apparatus defined in claim 1, wherein said actuating means is relatively fixed member on said equipment and a depending part secured to said valve member is adapted to engage said actuating means.

21. In the apparatus defined in claim 1, said vibrating means being on said equipment and being connected to positively effect vibration of at least a part of said equipment, which in turn transmits vibrational forces to said valve actuating means for vibrating the valve member connected thereto.

* * * * *